(12) United States Patent
Little et al.

(10) Patent No.: US 8,776,215 B2
(45) Date of Patent: Jul. 8, 2014

(54) CREDENTIAL DEVICE PAIRING

(75) Inventors: Zachary W. Little, Redmond, WA (US); Alain Luc Michaud, Quebec (CA)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 12/614,138

(22) Filed: Nov. 6, 2009

(65) Prior Publication Data

US 2011/0113485 A1 May 12, 2011

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*G06F 21/31* (2013.01)

(52) U.S. Cl.
CPC ........ *G06F 21/31* (2013.01); *G06F 2221/2129* (2013.01)
USPC ........ 726/18; 726/5; 726/16; 726/17; 726/19; 726/27; 455/41.1; 455/41.2; 455/41.3

(58) Field of Classification Search
CPC . G06F 21/00; G06F 21/31; G06F 2221/2129; G06F 21/82; G06F 21/83
USPC ................. 726/16–19, 27–28; 455/41.1–41.3
See application file for complete search history.

(56) References Cited

U.S. PATENT DOCUMENTS

| 7,436,300 | B2 | 10/2008 | Glass et al. |
| 7,519,816 | B2 * | 4/2009 | Phillips et al. ................ 713/168 |
| 7,657,255 | B2 * | 2/2010 | Abel et al. ................. 455/414.1 |
| 7,711,324 | B2 * | 5/2010 | Wutka ........................... 455/41.2 |
| 7,802,297 | B2 * | 9/2010 | Bennett et al. .................. 726/19 |
| 8,045,961 | B2 * | 10/2011 | Ayed et al. .................... 455/411 |
| 2006/0068760 | A1 | 3/2006 | Hameed et al. |
| 2006/0094461 | A1 * | 5/2006 | Hameed et al. ............ 455/552.1 |
| 2006/0105712 | A1 * | 5/2006 | Glass et al. .................. 455/41.2 |
| 2007/0141988 | A1 * | 6/2007 | Kuehnel et al. .............. 455/41.2 |
| 2007/0294556 | A1 * | 12/2007 | Wutka ........................... 713/324 |
| 2008/0016558 | A1 * | 1/2008 | Aull et al. ......................... 726/9 |
| 2008/0031155 | A1 * | 2/2008 | Korus et al. ................... 370/254 |

(Continued)

FOREIGN PATENT DOCUMENTS

WO     2007122224 A1   11/2007

OTHER PUBLICATIONS

Ranta, et al., "Human Interface Device (HID) Profile Version 1.0 Adopted", Retrieved at <<http://www.bluetooth.com/NR/rdonlyres/0BE438ED-DC1B-41D1-AAC0-1AAA956097A2/980/HID_SPEC_V10.pdf>> May 22, 2003, pp. 1-123.

(Continued)

*Primary Examiner* — Jeffrey Pwu
*Assistant Examiner* — Jayesh Jhaveri
(74) *Attorney, Agent, or Firm* — Aaron Chatterjee; Andrew Sanders; Micky Minhas (57) ABSTRACT

In one or more implementations, a computing device receives an indication that a device is attempting to pair with the computing device. If a user is not currently authenticated with respect to the computing device, inputs received by the device are restricted from being used by the computing device for uses other than authenticating the user.

20 Claims, 4 Drawing Sheets

(56) References Cited

U.S. PATENT DOCUMENTS

| | | | |
|---|---|---|---|
| 2008/0240440 A1* | 10/2008 | Rose et al. | 380/277 |
| 2008/0248748 A1* | 10/2008 | Sangster et al. | 455/41.2 |
| 2009/0134972 A1* | 5/2009 | Wu et al. | 340/5.82 |
| 2009/0174525 A1* | 7/2009 | Yamauchi | 340/5.8 |
| 2009/0193514 A1 | 7/2009 | Adams et al. | |
| 2009/0222908 A1* | 9/2009 | Warren | 726/18 |
| 2010/0176915 A1* | 7/2010 | Hayes | 340/5.2 |

OTHER PUBLICATIONS

Saxena, et al., "Universal Device Pairing using an Auxiliary Device", Retrieved at <<http://delivery.acm.org/10.1145/1410000/1408672/p56-saxena.pdf?key1=1408672&key2=2455901521&coll=GUIDE&d1=GUIDE&CFID=49756346&CFTOKEN=80322576>>, In the proceedings of Symposium on Usable Privacy and Security, Jul. 23-25, 2008, pp. 12.

Valkonen, et al., "Usability Testing for Secure Device Pairing in Home Networks", Retrieved at <<http://74.125.77.132/search?q=cache%3A-MQo7y36WAkJ%3Awww.comp.lancs.ac.uk%2Fiwssi2007%2Fpapers%2Fiwssi2007-03.pdf+pairing+device+to+PC+before+user+authenticated&hl=en&gl=in>> Aug. 21, 2009, pp. 1-8.

"Bluetooth Proximity-Based Access", Retrieved at <<http://www.google.co.in/url?sa=t&source=web&ct=res&cd=10&url=http%3A%2F%2Fwww.credant.com%2Fresources%2Fdatasheets%2Fdoc_download%2F91-bluetooth-proximity-based-access-technical-brief-360-kb.html&ei=eBWSSobLCt3LjAfcn8H8DQ&rct=j&q=device+pairing+%2B+authenticate+the+user&usg=AFQjCNFcMqst7qbPJ8GsJGqWgIQ0UfJCqQ>> Aug. 21, 2009, pp. 1-4.

* cited by examiner

CREDENTIAL DEVICE PAIRING

BACKGROUND

Wireless peripheral devices are becoming ever more common. Indeed, in some instances the wireless peripheral device functions as a primary source of user inputs to the computing device, e.g., a wireless keyboard, wireless cursor control device, and so on. However, conventional techniques used to authenticate a user prevented manufacturers from providing the wireless peripheral device as the sole device that would be permitted to interact with the computing device to support this authentication.

Consequently, conventional authentication techniques required the manufacturer to provide a wired peripheral device (e.g., a wired keyboard) to authenticate the user, such as by supplying a user name and password. After authentication, the wired peripheral device was rarely used by the user, which was both inefficient to the user and expensive for the manufacturer to supply the device.

SUMMARY

Device pairing techniques are described. In one or more implementations, a computing device receives an indication that a device is attempting to pair with the computing device. If a user is not currently authenticated with respect to the computing device, inputs received by the device are restricted from being used by the computing device for uses other than authenticating the user.

In an implementation, one or more computer-readable media comprise instructions stored thereon that, responsive to execution by a computing device, cause the computing device to determine whether a user has been authenticated by the computer in response to an attempt by a wireless device to pair with the computing device. If the user has not been authenticated by the computing device, inputs received from the wireless device are restricted from being used by the computing device for uses other than authenticating the user. If the user has been authenticated by the computing device, inputs received from the wireless device by the computing device are permitted for uses other than authenticating the user.

In an implementation, a computing device comprises one or more modules to initiate a boot-up process of the computing device and receive an indication wirelessly by the computing device from a wireless keyboard during the boot-up process, the indication indicating that the wireless keyboard is attempting to pair with the computing device. Inputs received from the wireless keyboard by the computing device are restricted for uses other than authenticating the user. Responsive to authentication of the user using inputs received from the wireless keyboard, the wireless keyboard is paired with the computing device, the boot-up process of the computing device is completed, and the computing device is permitted to use subsequent inputs received from the wireless keyboard for uses other than authenticating the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

With wireless peripheral devices becoming increasingly more common, problems have arisen when the device is not paired with the computing device but is to serve as a source of inputs that are used to authenticate a user. For example, a personal computer (PC) may be shipped by a manufacturer to a user with a wireless keyboard. Because the keyboard is not yet paired with the PC, however, the keyboard was not able to be used to authenticate the user using conventional techniques. Therefore, in such an instance if the manufacturer wished to protect the computing device through authentication, the manufacturer was forced to also ship a wired keyboard that could be used to authenticate the user, after which the user could then pair the wireless keyboard with the PC.

Device pairing techniques are described. In an implementation, the computing device is configured to pair a device with the computer by requiring the device itself to be used to perform the authentication. Thus, this prevents the device from being paired unless a user of the device is also able to be authenticated, e.g., provide a correct user name and password using the device. For example, to pair a wireless keyboard with a PC, the keyboard could be required by the PC to provide the user's name and/or password before pairing the wireless keyboard with the PC. Thus, the computing device may restrict inputs provided by the wireless keyboard from being used for purposes other than authenticating the user. A variety of different examples are contemplated, further discussion of which may be found in relation to the following discussion.

In the following discussion, an example environment is first described that is operable to employ the techniques described herein. Example procedures are then described, which may be employed in the example environment as well as in a variety of other environments. Consequently, the example environment is not limited to performance of the example procedures and the example procedures are limited to being performed in the example environment.

Example Environment

Figure 1:
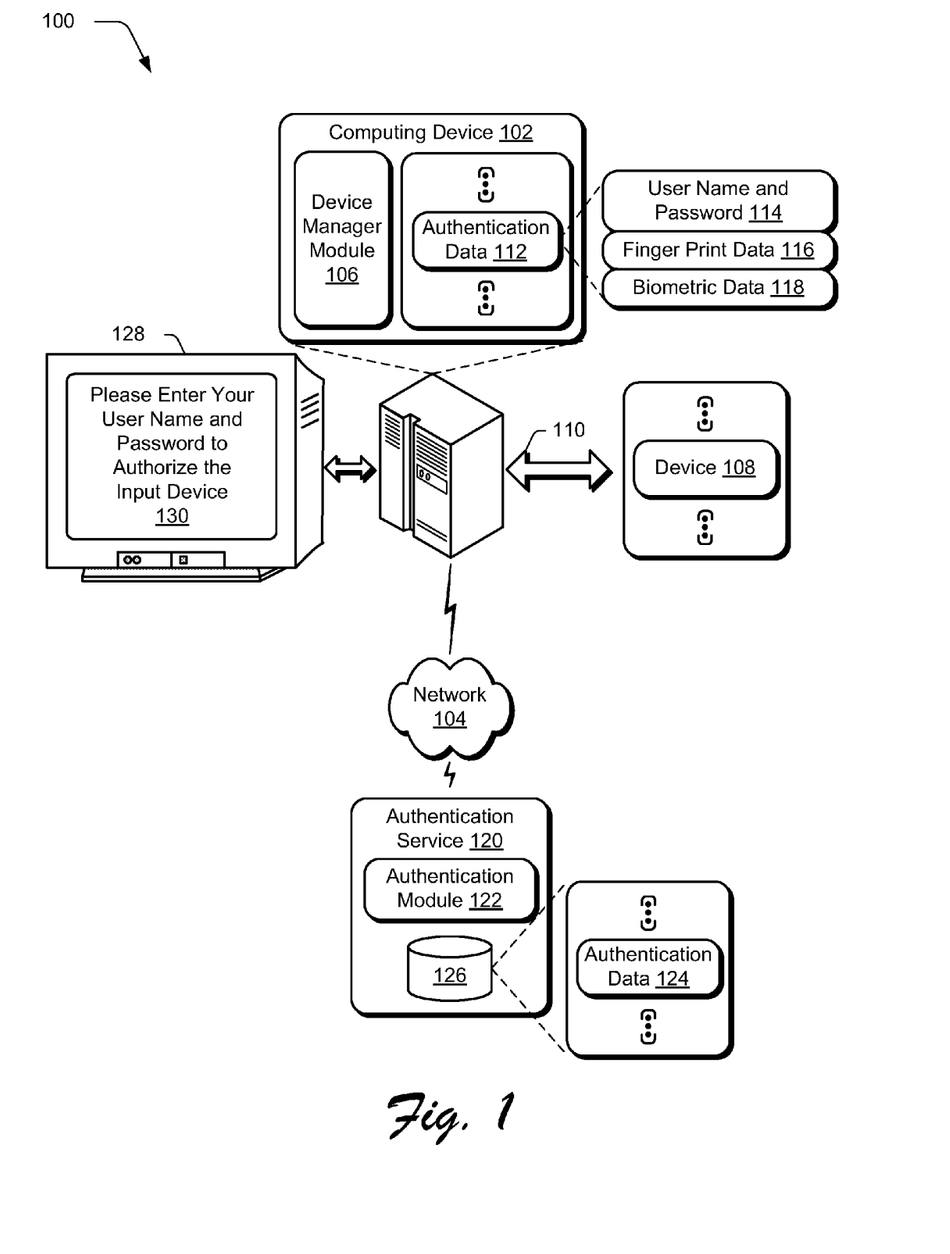
FIG. 1 is an illustration of an environment in an example implementation that is operable to employ device pairing techniques.

FIG. 1 is an illustration of an environment 100 in an example implementation that is operable to employ device pairing techniques. The illustrated environment 100 includes a computing device 102. The computing device 102 may be configured in a variety of ways. For example, the computing device 102 may be configured as a traditional computer (e.g., a personal computer), a mobile station, a netbook, a tablet computer, an entertainment appliance, a set-top box communicatively coupled to a display device, a wireless phone, a game console, and so forth. Thus, the computing device 102 may range from a full resource device with substantial memory and processor resources (e.g., a personal computer, game console, server, etc.) to a low-resource device with limited memory and/or processing resources (e.g., traditional set-top box, hand-held game console, and so on). The computing device 102 may also relate to functionality that is usable to cause the device to perform one or more operations, such as software.

The computing device 102 as illustrated includes a device manager module 106. The device manager module 106 is representative of functionality of the computing device 102 to pair a device 108 with the computing device 102. For example, the pairing of the device 108 with the computing device 102 may be used to form a relationship that involves a communication channel 110 to communicate data between the devices.

In an implementation, the device manager module 106 is configured to restrict functionality of the computing device 102 that is accessible to the device 108 if a user is not currently authenticated by the computing device 102. For example, the device manager module 106 may also be representative of functionality of the computing device 102 to determine whether a user is currently authenticated (e.g., "logged in") with respect to the computing device 102.

This determination may be performed in a variety of ways by the device manager module 106. For instance, the computing device 102 may store a variety of authentication data 112 that may be used to verify that a user "is who they say they are." Illustrated examples of authentication data 112 include a user name and password 114, fingerprint data 116, biometric data 118, and so on. Biometrics may refer to techniques that may be used to uniquely recognize humans based upon one or more intrinsic physical or behavioral traits, e.g., a retinal scan, the fingerprint data 116, voice recognition, and so on.

The determination may also be performed in conjunction with an authentication service 120 that is accessible to the computing device 102 over network 104. As illustrated, the authentication service 120 includes an authentication module 122 that is representative of functionality of the service to verify credentials of the user. For instance, the authentication service 120 may also store authentication data 124 and storage 126. The authentication data 124 may be the same as or different from the authentication data 112 stored locally by the computing device 102. The authentication service 120 may also be leveraged for a variety of other functionality, such as to enable access to a plurality of different websites via a single login to the authentication service 120. A variety of other examples are also contemplated.

Thus, if the device manager module 106 detects an attempt by the device 108 to pair with the computing device 102 and a user is not currently authenticated by the computing device 102, the device manager module 106 may restrict the functionality of the device 108. As illustrated in FIG. 1, for instance, the computing device 102 is communicatively coupled to a display device 128 displays a user interface 130. The user interface 130 is configured to prompt a user to provide one or more inputs through interaction with the device 108 that may be used to authenticate the user. Once the user has been authenticated, the device manager module 106 may permit the device 108 to be paired with the computing device 102. In this way, the device manager module 106 may protect the computing device 102 from "malicious" devices 108 yet still enable the device 108 to be used to authenticate the user. A variety of other examples are also contemplated, further discussion of which may be found in relation to the following figure.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the device pairing techniques described below are platform-independent, meaning that the techniques may be implemented on a variety of commercial computing platforms having a variety of processors.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

Figure 2:
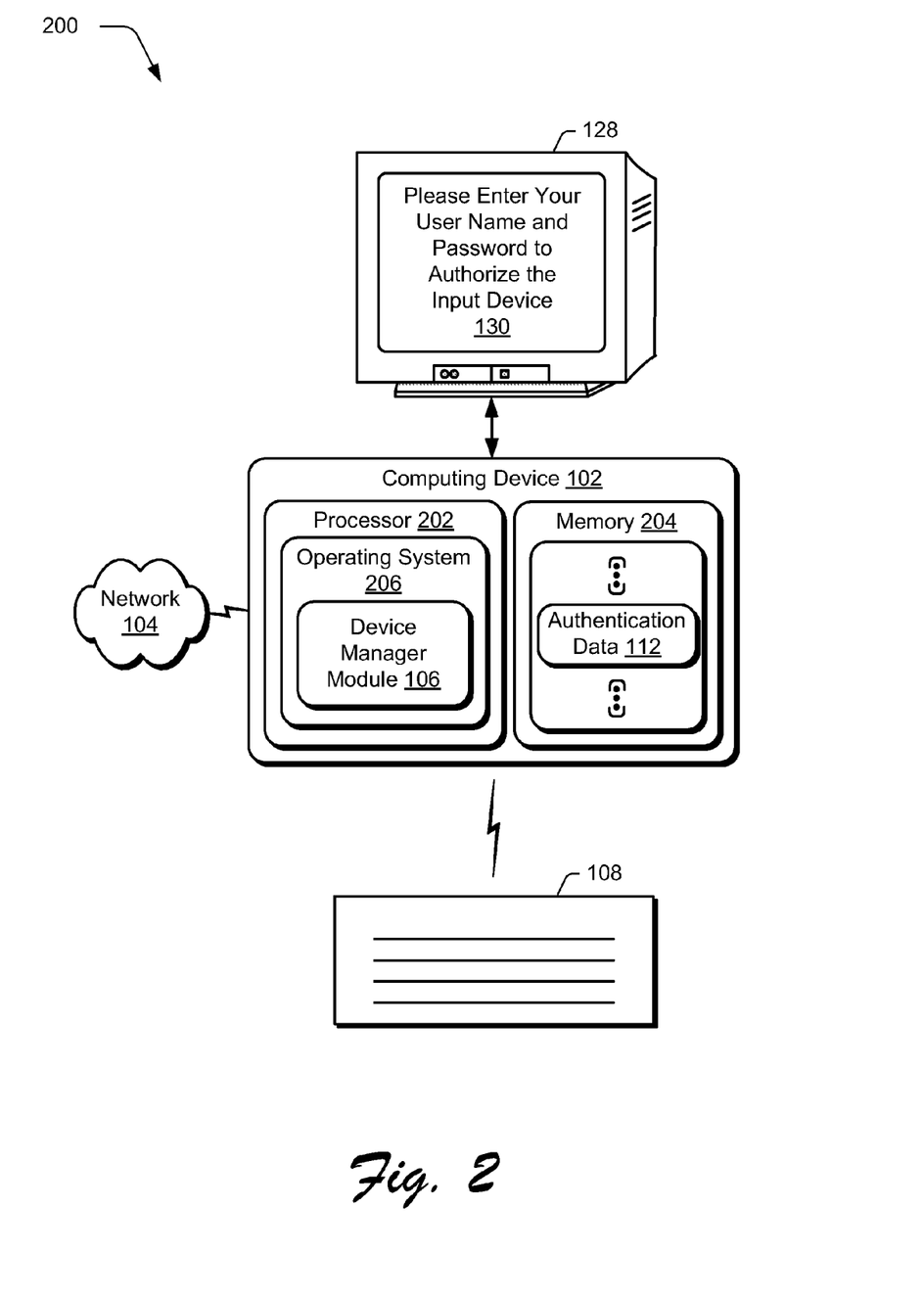
FIG. 2 is an illustration of a system in an example implementation showing a device of FIG. 1 as configured as a wireless keyboard that attempts to pair with a computing device of FIG. 1.

FIG. 2 is an illustration of a system 200 in an example implementation showing the device 108 of FIG. 1 configured as a wireless keyboard that attempts to pair with the computing device 102. The computing device 102 in this example is illustrated as having a processor 202 and memory 204. An operating system 206 is illustrated as being executed on the processor 202 and is storable in memory 204. Functionality of the device manager module 106 is illustrated as being incorporated within the operating system 206, although a variety of other examples are also contemplated, such as a stand-alone application, a "plug-in" module, and so on.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory is shown, a wide variety of types and combinations of memory may be employed, such as random access memory (RAM), hard disk memory, removable medium memory, and other types of computer-readable media.

In this example, the device 108 is configured as a wireless keyboard. It should be readily apparent, however, that a variety of different configurations are contemplated without departing from the spirit and scope thereof, such as a camera or other human interactive device. Because the device manager module 106 is configured to accept inputs from the device 108 to authenticate a user, the device 108 may be provided by a manufacturer of the computing device 102 to a user who purchased the computing device 102 as the primary means by which the user may enter text that may be used to authenticate the user, e.g., a user name and password. Thus, the manufacturer is not forced to also provide a wired keyboard for the sole purpose of entering the authentication data, which is then typically abandoned for the wireless keyboard. Further discussion of the pairing of the device 108 when configured as a wireless keyboard may be found in relation to FIG. 4.

Example Procedures

The following discussion describes device pairing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
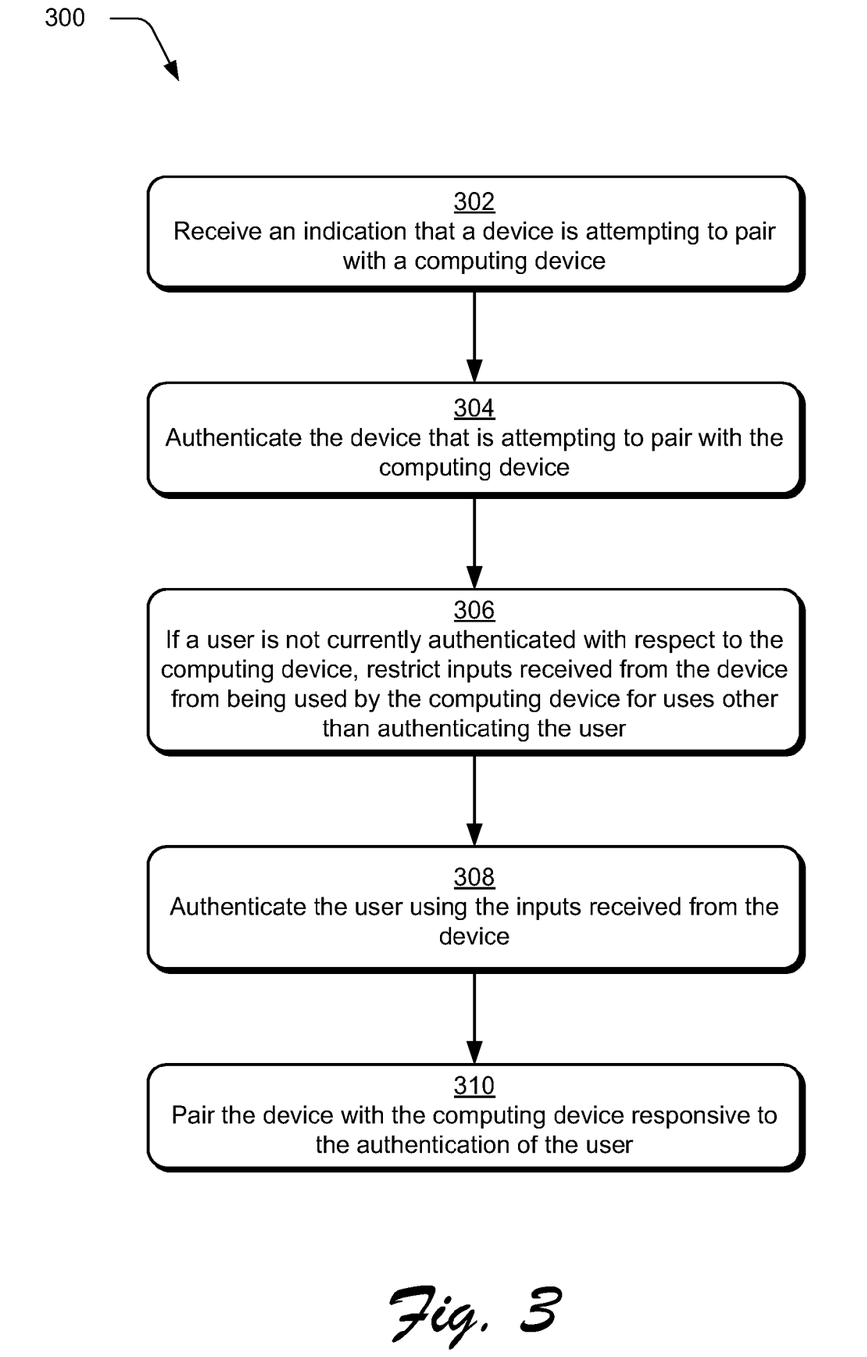
FIG. 3 is a flow diagram depicting a procedure in an example implementation in which functionality of a device that is not paired with a computing device is restricted from uses other than providing data that is usable to authenticate a user.

FIG. 3 depicts a procedure 300 in an example implementation in which functionality of a device that is not paired with a computing device is restricted from uses other than providing data that is usable to authenticate a user. An indication is received that a device is attempting to pair with a computing device (block 302). For example, a user may purchase the device 108 to be used in conjunction with the computing device 102. As previously described, the device 108 may assume a variety of configurations that includes both wired connections and/or wireless connections. The device 108, for instance, may be configured as a wireless headset to pair with the computing device 102 configured as a wireless phone, a human interactive device that is to function as an input device for a traditional personal computer, a wireless controller to connect to a game console, a camera to connect to a set-top box, a printer to interact with a plurality of different computing devices wirelessly, a mobile media device (e.g., music player) and a desktop PC, and so on.

Additionally, the indication may be initiated by the device 108 in a variety of ways. For example, the indication may be transmitted in response to initiation of a button of the device 108 by a user. The indication may also be transmitted by the device 108 automatically, e.g., such as in response to detection of the computing device 102 by the device 108. The indication may also be transmitted by the device 108 and response to a periodic query by the computing device 102. A variety of other examples are also contemplated.

Authenticate the device that is attempted to pair with the computing device (block 304). For example, a PIN may be used to perform the authentication of the device that is entered on the device and/or the computing device. Thus, the computing device may be protected from a "man in the middle" attack.

If the user is not currently authenticated with respect to the computing device, inputs received from the device are restricted from being used by the computing device for uses other than authenticating the user (block 306). For example, the device 108 may be configured to employ a variety of different functionality, such as to upload photos from the camera, provide inputs to control operation of the computing device 102, to provide functionality to the computing device 102 (e.g., such as through configuration as a peripheral device such as a printer, data storage device, etc.), and so on. However, the device manager module 106 may limit the uses that may be employed using inputs received from the device 108 to uses that involve authentication of the user. These uses may include functionality to communicate data to and from the device 108 as well as to authenticate a user using data communicated from the device 108.

The user is then authenticated using inputs received from the device (block 308). The authentication may be performed in a variety of ways. For example, authentication of the data may be performed locally at the computing device 102 by the device manager module 106 using the authentication data 112 stored locally at the computing device 102. In another example, authentication may be performed in conjunction with an authentication service 120 that is accessible to the device manager module 106 via the network 104. For instance, the device manager module 106 may communicate a user name and password via the network 104 to the authentication service 120 to verify that the user "is who they say they are."

Additionally, the authentication may take a variety of forms, such as using username and password 114 as previously described, using biometric data 118 (e.g., fingerprint data, a retinal scan, or voice data), and other data that may be used to uniquely identify the user. Thus, the device 108 may assume a wide variety of configurations to collect a wide variety of data that may be used to authenticate a user of the device 108.

The device is then paired with the computing device responsive to the authentication of the user (block 310). Once the user is authenticated, the restrictions on the inputs of the device 108 by the device manager module 106 may be removed such that the device 108 may be paired with the computing device 102. For instance, the device manager module 106 may permit the operating system 206 to complete pairing of the device such that the device 108 may be used for uses other than authenticating the user, e.g., image upload, word processing, spreadsheets, voice communication, music download, global positioning functionality, and so on.

Figure 4:
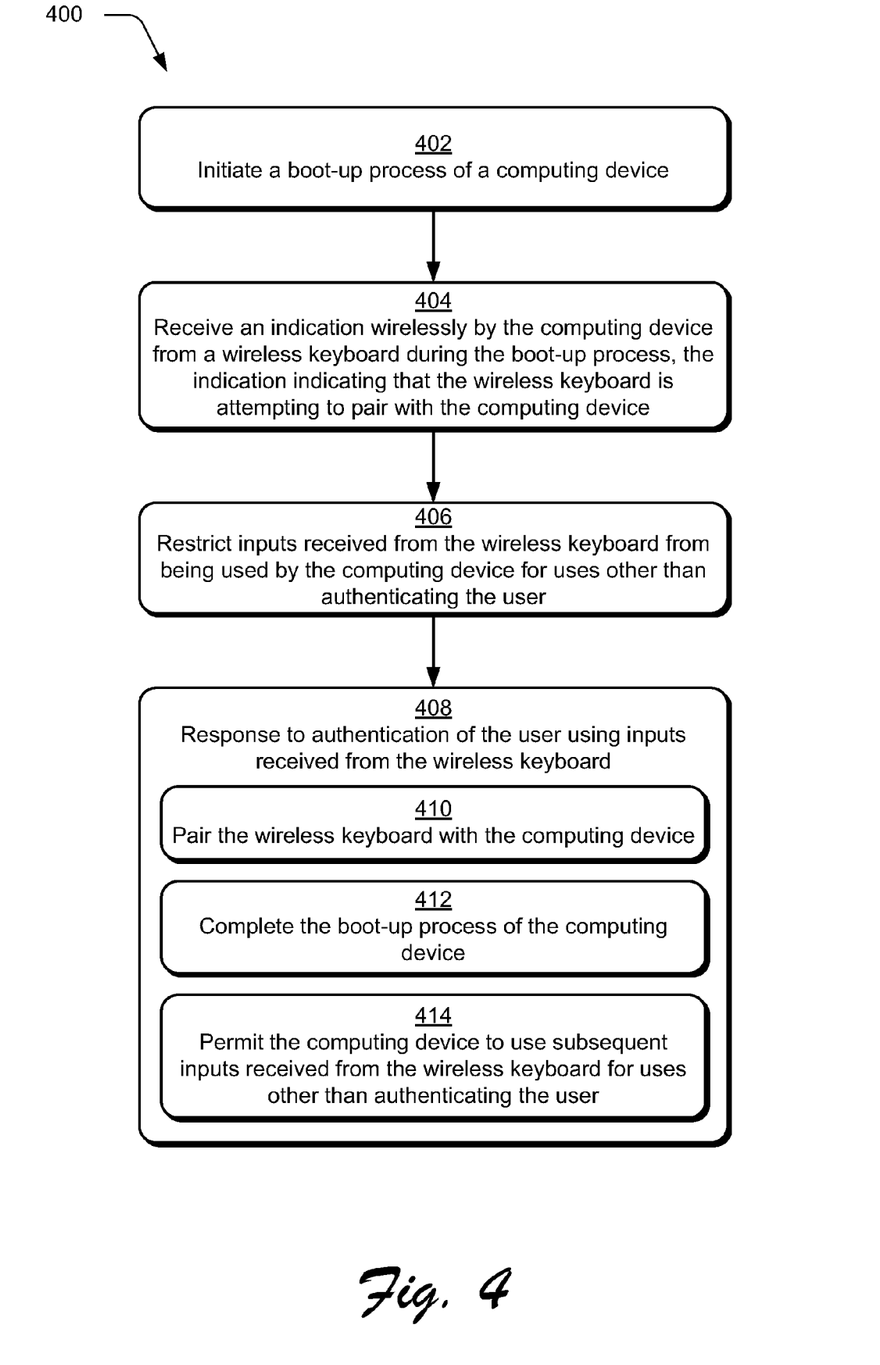
FIG. 4 is a flow diagram depicting a procedure in an example implementation in which a wireless keyboard is used to provide authentication data to verify a user even though the wireless keyboard has not completed pairing with the computing device.

FIG. 4 depicts a procedure 400 in an example implementation in which a wireless keyboard is used to provide authentication data to verify a user even though the wireless keyboard has not been paired with the computing device. A boot-up process of a computing device is initiated (block 402). For example, a user may receive a computing device 102 that was ordered from a manufacturer, "hook up" the computing device 102, and turn it on to initiate the boot-up process.

An indication is received wirelessly by the computing device from a wireless keyboard during the boot process, the indication indicating that the wireless keyboard is attempting to pair with the computing device (block 404). Continuing with the previous example, the user may select a button of the wireless keyboard to initiate pairing, put batteries in the wireless keyboard which causes the wireless keyboard to "look for" the computing device 102 automatically, and so on as previously described. As before, the device may also be authenticated using a PIN or other authentication technique to protect against a "man in the middle" attack.

Inputs received from the wireless keyboard are restricted from being used by the computing device for uses other than authenticating user (block 406). For example, the device manager module 106 may enable functionality of the computing device 102 to receive inputs, but restrict those inputs from being used for uses other than authenticating the user.

Responsive to authentication of the user using inputs received from the wireless keyboard (block 408), the wireless keyboard is paired with a computing device (block 410), the boot-up process of the computing device is completed (block 412), and the computing device is permitted to you subsequent inputs received from the wireless keyboard for uses other than authenticating user (block 414). Thus, in this way the wireless keyboard may gain "full" functionality with respect to the computing device 102 yet still protect the computing device 102 from malicious devices. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
    initiating a boot-up process of the computing device;
    receiving an indication wirelessly by the computing device from a wireless input device during the boot-up process, the indication indicating that the wireless input device is attempting to pair with the computing device;
    restricting inputs received from the wireless input device from being used by the computing device for uses other than authenticating a user;
    utilizing the inputs to authenticate the user based at least in part on information associated with the user; and
    responsive to authentication of the user using the inputs:
        pairing the wireless input device with the computing device;
        completing the boot-up process of the computing device; and
        permitting the computing device to use subsequent inputs received from the wireless input device for uses other than authenticating the user.

2. A method as described in claim 1, wherein the authentication of the user does not involve a user name and password.

3. A method as described in claim 1, wherein the authentication of the user includes verification of a user name and password stored locally at the computing device.

4. A method as described in claim 1, wherein the authentication of the user involves a user name and password that are communicated via a network connection for verification by an authentication service.

5. A method as described in claim 4, wherein the authentication by the authentication service permits access to a plurality of websites without reentering the user name and the password.

6. A method as described in claim 1, wherein pairing the wireless input device with the computing device forms a relationship between the computing device and the wireless input device that involves a communication channel to enable said permitting subsequent inputs received from the wireless input device to be used for uses other than authenticating the user.

7. A method as described in claim 1, wherein the wireless input device is a human interactive device.

8. A method as described in claim 1, wherein the wireless input device is configured to employ biometrics to be used to authenticate the user.

9. A method as described in claim 8, wherein the biometrics include a fingerprint scan, a retinal scan, or collection of voice data.

10. One or more computer-readable media other than a signal per se, the one or more computer-readable media comprising instructions stored thereon that, responsive to execution by a computing device, cause the computing device to:
    initiate a boot-up process of the computing device;
    receive an attempt by a wireless input device to pair with the computing device during the boot-up process;
    restrict inputs received from the wireless input device from being used by the computing device for uses other than authenticating a user;
    utilize the inputs to authenticate the user based at least in part on information associated with the user; and
    responsive to a determination that the user has been authenticated by the computing device using the inputs to:
        pair the wireless input device with the computing device;
        complete the boot-up process of the computing device; and
        permit use of inputs received from the wireless input device by the computing device for uses other than authenticating the user.

11. One or more computer-readable media as described in claim 10, wherein the authentication of the user does not involve a user name and password.

12. One or more computer-readable media as described in claim 10, wherein:
    the authentication of the user involves a user name and password that are communicated via a network connection for verification by an authentication service; and
    the authentication by the authentication service permits access to a plurality of websites without reentering the user name and the password.

13. One or more computer-readable media as described in claim 10,
    wherein pairing the wireless input device with the computing device forms a relationship between the computing device and the wireless input device that involves a communication channel to enable said permitting subsequent inputs received from the wireless input device to be used for uses other than authenticating the user.

14. A computing device comprising one or more modules to:
    initiate a boot-up process of the computing device;
    receive an indication wirelessly by the computing device from a wireless input device during the boot-up process, the indication indicating that the wireless input device is attempting to pair with the computing device;
    restrict inputs received from the wireless input device from being used by the computing device for uses other than authenticating a user;
    utilize the inputs to authenticate the user based at least in part on information associated with the user; and
    responsive to authentication of the user using inputs received from the wireless input device:
        pair the wireless input device with the computing device;
        complete the boot-up process of the computing device; and
        permit the computing device to use subsequent inputs received from the wireless input device for uses other than authenticating the user.

15. A computing device as described in claim 14, wherein the inputs include one or more biometric inputs that are usable to uniquely identify the user using one or more intrinsic physical or behavioral traits.

16. A method as described in claim 1, wherein the inputs include a personal identification number (PIN).

17. One or more computer-readable media as described in claim 10, wherein the inputs include a PIN.

18. One or more computer-readable media as described in claim 10, wherein the inputs include one or more biometric inputs that are usable to uniquely identify the user, including a fingerprint scan, a retinal scan, or collection of voice data.

19. A computing device as described in claim 14, wherein the inputs include a PIN.

20. A computing device as described in claim 15, wherein the biometric inputs include a fingerprint scan, a retinal scan, or collection of voice data.

* * * * *